(12) United States Patent
Schoeneberger

(10) Patent No.: US 7,274,787 B1
(45) Date of Patent: Sep. 25, 2007

(54) SCHEDULED RETURN TO QUEUE WITH PRIORITY (SRQP)

(75) Inventor: Carl Schoeneberger, Dallas, TX (US)

(73) Assignee: Intervoice, Inc., Dallas, TX (US)

(*) Notice: Subject to any disclaimer, the term of this patent is extended or adjusted under 35 U.S.C. 154(b) by 0 days.

(21) Appl. No.: 10/327,348

(22) Filed: Dec. 20, 2002

Related U.S. Application Data

(60) Provisional application No. 60/404,076, filed on Aug. 16, 2002.

(51) Int. Cl.
*H04M 3/00* (2006.01)
*H04M 5/00* (2006.01)

(52) U.S. Cl. .............................. 379/265.01; 379/265.02

(58) Field of Classification Search ................ 379/309, 379/265.01, 266.06, 210.01, 266.03, 265.13, 379/265.02, 210.02; 370/252, 352
See application file for complete search history.

(56) References Cited

U.S. PATENT DOCUMENTS

| | | | | |
|---|---|---|---|---|
| 5,282,243 A * | 1/1994 | Dabbaghi et al. | ...... | 379/210.02 |
| 5,325,423 A | 6/1994 | Lewis | .......................... | 379/90 |
| 5,390,295 A | 2/1995 | Bates et al. | .................. | 395/157 |
| 5,459,780 A | 10/1995 | Sand | .......................... | 379/265 |
| 5,488,411 A | 1/1996 | Lewis | ........................... | 348/8 |
| 5,491,795 A | 2/1996 | Beaudet et al. | ............. | 395/159 |
| 5,530,744 A | 6/1996 | Charalambous et al. | .... | 379/265 |
| 5,612,730 A | 3/1997 | Lewis | ........................... | 348/8 |
| 5,613,068 A | 3/1997 | Gregg et al. | ............ | 395/200.13 |
| 5,835,126 A | 11/1998 | Lewis | ........................... | 348/8 |
| 5,848,143 A | 12/1998 | Andrews et al. | ............ | 379/219 |
| 5,903,642 A * | 5/1999 | Schwartz et al. | ........... | 379/309 |
| 6,046,741 A | 4/2000 | Hochmuth | ................... | 345/348 |
| 6,046,762 A | 4/2000 | Sonesh et al. | ................ | 348/16 |
| 6,049,603 A * | 4/2000 | Schwartz et al. | ........... | 379/309 |

(Continued)

FOREIGN PATENT DOCUMENTS

EP   1 016 998 A2   5/2000

(Continued)

OTHER PUBLICATIONS

Dr. D. E. Brown, "The Interaction Center Platform™", Interactive Intelligence, Apr. 6, 2001, pp. 1 of 31.

(Continued)

*Primary Examiner*—Ahmad F. Matar
*Assistant Examiner*—Thjuan K. Addy
(74) *Attorney, Agent, or Firm*—Fulbright & Jaworski LLP

(57) ABSTRACT

A system and method of distributing contact volume in a contact center when the volume of incoming calls greatly exceeds the number of agents currently answering calls. In an embodiment of the invention, the caller calling in at such a peak time is notified of the relatively long wait time to speak to an agent. The caller is then prompted as to whether he or she wishes to hold or accept a later callback time to receive immediate service. By accepting a later callback, the caller may access the contact center at a later time by dialing a unique telephone number or by entering a unique code when dialing the main line. This scheduled return to queue with priority system and method seeks to essentially eliminate high call volume times by redistributing those calls to times when the agent volume exceeds the incoming call volume, thus ultimately decreasing call center staffing costs.

30 Claims, 5 Drawing Sheets

U.S. PATENT DOCUMENTS

| | | | |
|---|---|---|---|
| 6,094,479 A | 7/2000 | Lindeberg et al. | 379/220 |
| 6,122,364 A | 9/2000 | Petrunka et al. | 379/265 |
| 6,141,341 A | 10/2000 | Jones et al. | 370/352 |
| 6,144,667 A | 11/2000 | Doshi et al. | 370/401 |
| 6,188,673 B1 * | 2/2001 | Bauer et al. | 370/252 |
| 6,188,761 B1 | 2/2001 | Dickerman et al. | 379/265 |
| 6,201,804 B1 | 3/2001 | Kikinis | 370/352 |
| 6,212,565 B1 | 4/2001 | Gupta | 709/229 |
| 6,219,648 B1 | 4/2001 | Jones et al. | 705/8 |
| 6,225,998 B1 | 5/2001 | Okita et al. | 345/356 |
| 6,266,058 B1 | 7/2001 | Meyer | 345/339 |
| 6,289,001 B1 | 9/2001 | Smyk | 370/216 |
| 6,298,383 B1 | 10/2001 | Gutman et al. | 709/229 |
| 6,301,480 B1 | 10/2001 | Kennedy, III et al. | 455/445 |
| 6,330,326 B1 * | 12/2001 | Whitt | 379/265.13 |
| 6,337,858 B1 | 1/2002 | Petty et al. | 370/356 |
| 6,366,577 B1 | 4/2002 | Donovan | 370/352 |
| 6,377,568 B1 | 4/2002 | Kelly | 370/352 |
| 6,400,804 B1 | 6/2002 | Bilder | 379/76 |
| 6,434,143 B1 | 8/2002 | Donovan | 370/356 |
| 6,445,695 B1 | 9/2002 | Christie, IV | 370/352 |
| 6,463,148 B1 | 10/2002 | Brady | 379/265.01 |
| 6,493,695 B1 | 12/2002 | Pickering et al. | 706/47 |
| 6,529,499 B1 | 3/2003 | Doshi et al. | 370/352 |
| 6,542,475 B1 | 4/2003 | Bala et al. | 370/271 |
| 6,574,218 B1 | 6/2003 | Cooklev | 370/352 |
| 6,577,726 B1 | 6/2003 | Huang et al. | 379/265.02 |
| 6,584,191 B1 | 6/2003 | McPartlan et al. | 379/265.02 |
| 6,590,596 B1 | 7/2003 | Rector | 345/810 |
| 6,600,735 B1 | 7/2003 | Iwama et al. | 370/352 |
| 6,611,590 B1 | 8/2003 | Lu et al. | 379/265.09 |
| 6,614,902 B1 | 9/2003 | Rizzetto | 379/265.11 |
| 6,615,235 B1 | 9/2003 | Copeland et al. | 709/203 |
| 6,639,982 B1 * | 10/2003 | Stuart et al. | 379/266.03 |
| 6,665,395 B1 | 12/2003 | Busey et al. | 379/265.09 |
| 6,674,713 B1 | 1/2004 | Berg et al. | 370/217 |
| 6,678,265 B1 | 1/2004 | Kung et al. | 370/352 |
| 6,678,718 B1 | 1/2004 | Khouri et al. | 709/204 |
| 6,687,251 B1 | 2/2004 | Mousseau et al. | 370/401 |
| 6,697,858 B1 | 2/2004 | Ezerzer et al. | 709/224 |
| 6,704,409 B1 | 3/2004 | Dilip et al. | 379/265.02 |
| 6,704,412 B1 | 3/2004 | Harris et al. | 379/269 |
| 6,724,884 B2 * | 4/2004 | Jensen et al. | 379/265.01 |
| 6,741,698 B1 * | 5/2004 | Jensen | 379/265.02 |
| 6,766,377 B1 | 7/2004 | Grabelsky et al. | 709/238 |
| 6,771,765 B1 | 8/2004 | Crowther et al. | 379/265.09 |
| 6,778,494 B1 | 8/2004 | Mauger | 370/230 |
| 6,781,959 B1 | 8/2004 | Garakani et al. | 370/242 |
| 6,823,382 B2 | 11/2004 | Stone | 709/224 |
| 6,850,599 B2 | 2/2005 | Yoshitani | 379/37 |
| 6,850,613 B2 | 2/2005 | McPartlan et al. | 379/265.02 |
| 6,868,059 B1 | 3/2005 | Jones et al. | 370/216 |
| 6,937,715 B2 | 8/2005 | Delaney | 379/265.09 |
| 7,035,252 B2 | 4/2006 | Cave et al. | 370/356 |
| 7,085,263 B1 | 8/2006 | Fitzgerald | 370/352 |
| 2001/0024997 A1 | 9/2001 | Sugano et al. | 477/2 |
| 2002/0071541 A1 | 6/2002 | Cheung et al. | 379/215.01 |
| 2003/0018702 A1 | 1/2003 | Broughton et al. | 709/202 |
| 2003/0133558 A1 | 7/2003 | Kung et al. | 379/215.01 |
| 2003/0195753 A1 | 10/2003 | Homuth | 705/1 |
| 2004/0054743 A1 | 3/2004 | McPartlan et al. | 709/206 |
| 2004/0066923 A1 | 4/2004 | Robinson | 379/166 |
| 2004/0141508 A1 | 7/2004 | Schoeneberger et al. | 370/401 |
| 2004/0221053 A1 | 11/2004 | Codella et al. | 709/231 |

FOREIGN PATENT DOCUMENTS

| | | |
|---|---|---|
| WO | WO99/65214 | 12/1999 |
| WO | WO 01/35601 | 5/2001 |
| WO | WO 01/61529 A2 | 8/2001 |

OTHER PUBLICATIONS

M. Taylor, "Integrated Versus Unified CTI—What's the Difference?", Interactive Intelligence, http://www.inin.com/news/presscoverage/presscoverage.asp?id=14, Aug. 2, 2001, pp. 1 of 9.

CosmoCom, "CosmoCall Universe™ Technology Overview", http://www.cosmocom.com/Productinfo/techover.htm, Aug. 2, 2001, pp. 1 of 3.

"*Message Classification in the Call Center*", by Stephan Busemann, Sven Schmeier, and Roman G. Arens. Published in Saarbrucken, Germany, pp. 158-165.

"*The Modernization of a Call Center*", by Karen Reasoner, University of Wyoming, Client Support Services, Information Technology, Laramie WY, 82070, pp. 270-273.

"*Redefining the Call Center: Customer Service on the Internet*", by D. Steul from San Francisco, Ca., pp. 38-42.

"Signaling Gateway CX6100-SG", Haraski et al., pp. 138-142, NEC Res & Develop., vol. 42, No. 2., Apr. 2001.

"Media Gateway CX3200", Naoki Satoh et al., pp. 133-137, NEC Res & Develop., vol. 42, No. 2, Apr. 2001.

* cited by examiner

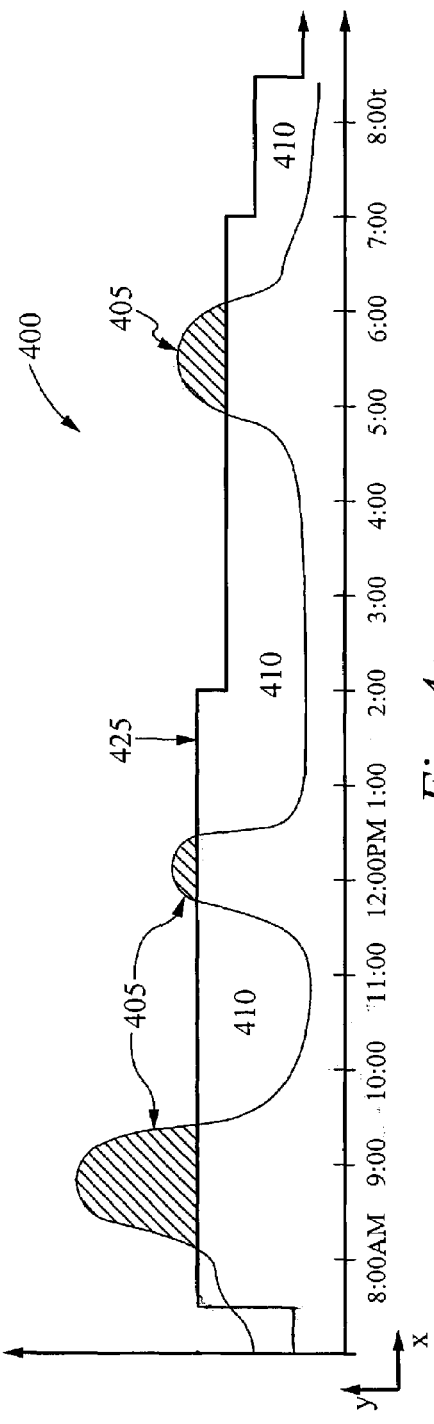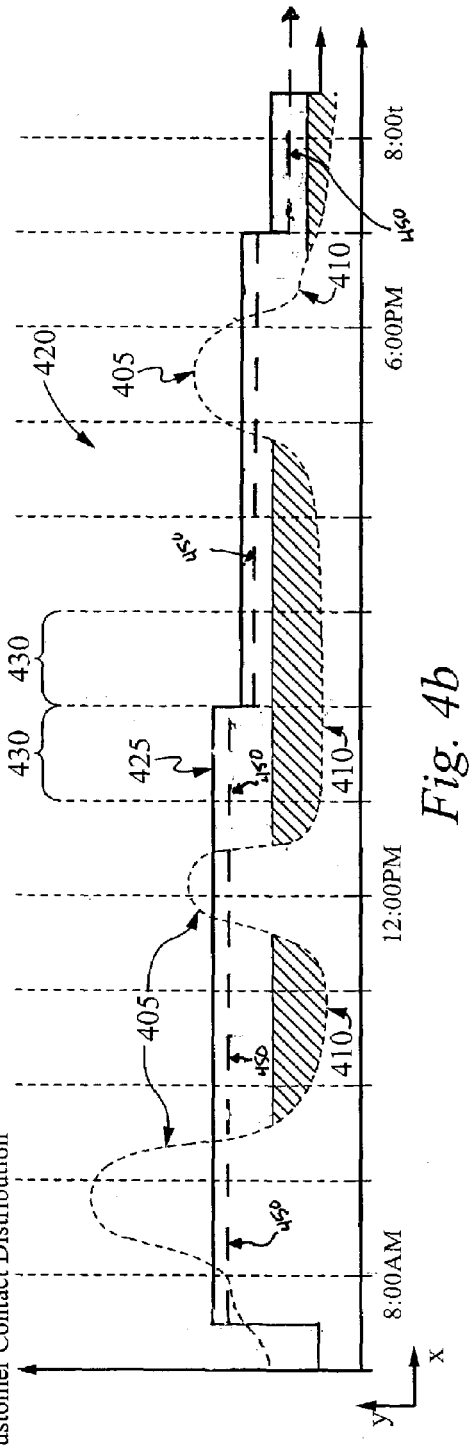

SCHEDULED RETURN TO QUEUE WITH PRIORITY (SRQP)

RELATED APPLICATION(S)

This patent application claims priority under 35 U.S.C. §119(e) of the co-pending, co-owned U.S. Provisional Patent Application Ser. No. 60/404,076, filed Aug. 16, 2002, and entitled "YOSEMITE ARCHITECTURE SPECIFICATION." The U.S. Provisional Patent Application Ser. No. 60/404,076, filed Aug. 16, 2002, and entitled "YOSEMITE ARCHITECTURE SPECIFICATION" is also hereby incorporated by reference in its entirety.

The co-pending, co-owned and co-filed United States patent application Ser. No. 10/327,360, filed Dec. 20, 2002, and entitled "REMOTE AGENT ACCESS METHOD TO A VOIP CONTACT CENTER WHERE HIGH QOS IS NOT SUPPORTED" is also hereby incorporated by reference in its entirety.

FIELD OF THE INVENTION

The present invention relates generally to the field of Contact Centers. More specifically, the present invention relates to the field of call queue management and priority designation.

BACKGROUND OF THE INVENTION

In Contact Centers, oftentimes the incoming contact will be required to hold for excessively long periods of time, leading to customer dissatisfaction. Generally, there are limits to the amount of time a person will remain on hold without becoming upset about the opportunity cost of their time spent holding. When they are subsequently connected to an agent, the frustration of being on hold will often taint the whole customer experience and is very wearing on the agents as well. Also, if the contact is accessing the Contact Center by a toll free call, there is significant telephony expense to support that contact while on hold. While the contact is on hold, they must remain on the telephone. If the telephone is a corded model, their ability to do other tasks is restricted. Additionally, regular announcements to the effect of "please continue holding, we will be with you soon," become a distraction to other work the contact is attempting to do while on hold. The contact on hold may also be irritated by the choice of music or advertising that is played to indicate that the connection to the Contact Center is still present.

Furthermore, contacts tend to initiate calls to Contact Centers at times that will cause "peaks" in the daily contact load. Depending on the application, these peaks will likely be realized at the beginning of the business day, at lunch time, and late in the afternoon. Staffing to meet these peaks will often leave agents idle during off peak times, and reducing the number of agents to match the average load for the Contact Center will increase contact hold times at these peaks.

Some Contact Centers provide a feature where a contact may leave a call back number so that when an agent is available, the contact will receive a return call. This is an improvement over holding for long periods, but it still means that the contact has no idea when they will be called, causing them to remain near the telephone and interfering with their involvement in normal daily activities while they wait for the return call. Further, the phone must be monitored and kept clear for the return call, lest they miss the important call back from the Contact Center. If the contact needs to run an errand, such as picking up children from school, there is a high likelihood they will miss the callback and have to start all over, unless the contact has a cell phone to give as the callback number. All of these tend to create the impression that somehow the Contact Center is "more important" than the contact.

What is needed is a Contact Center with a system that allows a contact calling into a Contact Center to receive service without unreasonable delay. What is also needed is a Contact Center that can accommodate contacts who call during "peak" hours by allowing the contact to choose a convenient time to call into the Contact Center, thereby conveniently scheduling a callback time into the contact's daily schedule.

SUMMARY OF THE INVENTION

A system and method of distributing contact volume in a contact center when the volume of incoming calls greatly exceeds the number of agents currently answering calls. In an embodiment of the invention, the caller calling in at such a peak time is notified of the relatively long wait time to speak to an agent. The caller is then prompted as to whether he or she wishes to hold or accept a later callback time to receive immediate service. By accepting a later callback, the caller may access the contact center at a later time by dialing a unique telephone number or by entering a unique code when dialing the main line. This scheduled return to queue with priority system and method seeks to essentially eliminate high call volume times by redistributing those calls to times when the agent volume exceeds the incoming call volume, thus ultimately decreasing call center staffing costs.

An embodiment of the present invention includes a method of distributing contact volume in a contact center comprising the steps of notifying a contact of a significant hold time when the contact enters the contact center having the significant hold time, calculating a callback time with a distribution algorithm in the event the contact does not wish to hold for the significant hold time, verifying that the callback time is acceptable to the contact, assigning a callback code to the contact, disconnecting the contact from the contact center and providing priority service to the contact when the contact enters the callback code at the verified callback time.

In this embodiment, when the contact does not wish to be assigned the callback code, the contact will hold for the significant hold time until service is provided. The verifying step also includes receiving a suggested callback time from the contact when the calculating step provides an unacceptable callback time, recalculating the callback time with the distribution algorithm and the suggested callback time and reverifying that the callback time is acceptable to the contact.

Also in this embodiment, the contact re-enters the contact center using the callback code. The distribution algorithm assigns the contact the callback time based on a set of predicted call volume data.

A further embodiment of the present invention includes a system for managing a queue and distributing contact volume in a contact center comprising means for notifying a contact of a significant hold time when the contact enters the contact center having the significant hold time, means for calculating a callback time with a distribution algorithm in the event the contact does not wish to hold for the significant hold time, means for verifying that the callback time is acceptable to the contact, means for assigning a callback code to the contact, means for disconnecting the contact from the contact center and means for providing priority service to the contact when the contact enters the callback code at the verified callback time.

In this further embodiment, when the contact does not wish to be assigned the callback code, the contact will hold for the significant hold time until service is provided. The verifying means also includes means for receiving a suggested callback time from the contact when the calculating means provides an unacceptable callback time, means for recalculating the callback time with the distribution algorithm and the suggested callback time and means for reverifying that the callback time is acceptable to the contact.

Also in this further embodiment, the contact re-enters the contact center using the callback code. The distribution algorithm assigns the contact the callback time based on a set of predicted call volume data.

A further embodiment of the present invention includes an article of manufacture comprising a computer readable medium bearing program code embodied therein for use with a computer, the computer program code including means for notifying a contact of a significant hold time when the contact enters a contact center having the significant hold time, means for calculating a callback time with a distribution algorithm in the event the contact does not wish to hold for the significant hold time, means for verifying that the callback time is acceptable to the contact, means for assigning a callback code to the contact, means for disconnecting the contact from the contact center and means for providing priority service to the contact when the contact enters the callback code at the verified callback time.

In this further embodiment, when the contact does not wish to be assigned the callback code, the contact will hold for the significant hold time until service is provided. The verifying means also includes means for receiving a suggested callback time from the contact when the calculating means provides an unacceptable callback time, means for recalculating the callback time with the distribution algorithm and the suggested callback time and means for reverifying that the callback time is acceptable to the contact.

Also in this further embodiment, the contact re-enters the contact center using the callback code. The distribution algorithm assigns the contact the callback time based on a set of predicted call volume data.

BRIEF DESCRIPTION OF THE DRAWINGS

FIG. 4a illustrates a graphical representation of a typical Contact load and capacity of an embodiment of the present invention.

FIG. 4b illustrates a graphical representation of a Contact Distribution of an embodiment of the present invention.

DETAILED DESCRIPTION OF THE PREFERRED EMBODIMENT

The present invention is a system and method for a scheduled return to a Contact Center 100 queue with priority. The details concerning the Contact Center 100 are disclosed in a co-filed, co-owned and co-pending United States Provisional Patent Application Ser. No. 60/435,974, entitled "YOSEMITE ARCHITECTURE SPECIFICATION II." The United States Provisional Patent Application Ser. No. 60/435,974, entitled "YOSEMITE ARCHITECTURE SPECIFICATION II" is also incorporated by reference in its entirety. Of course, it will be readily apparent to one skilled in the art that in alternative embodiments of the present invention disclosed in the following specification can and will be utilized in contact centers other than the Contact Center 100 incorporated by reference above.

Figure 1:
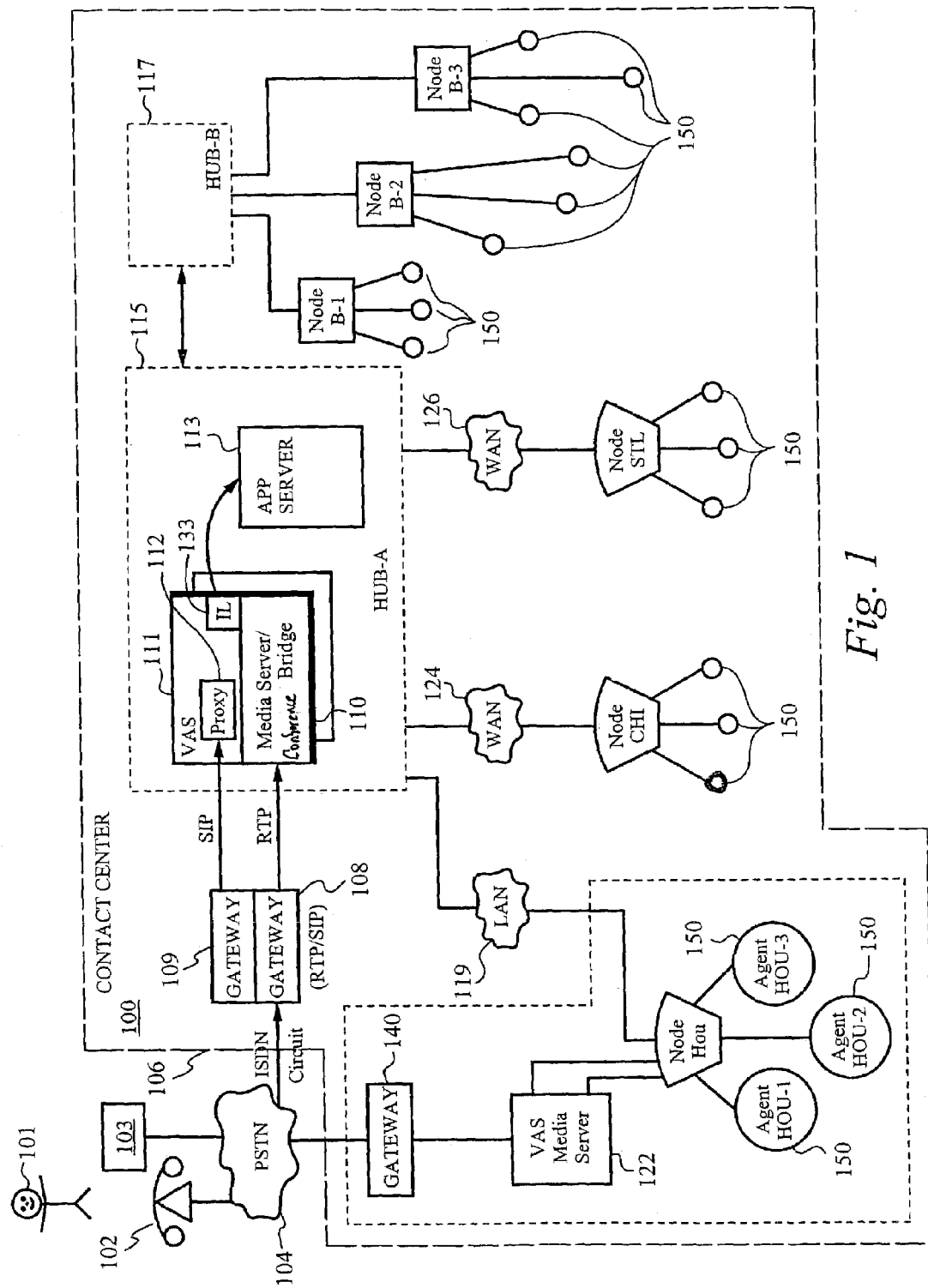
FIG. 1 illustrates a graphical representation of a Contact Center architecture of the preferred embodiment of the present invention.

The Contact Center 100 depicted in FIG. 1 is preferably used to implement the present invention. Contacts 101 access the Contact Center 100 through a Public Switched Telephone Network (PSTN) 104 using any type of Telephone 102 connected to the PSTN 104. It should be understood that the Contacts 101 may also enter the Contact Center 100 by way of web collaboration or as a chat contact. The details concerning these contacts have been incorporated by reference in the application above. The Contacts 101 are routed to appropriate Agents 150 by the Hubs 115, 117 and Nodes (Node CHI, Node STL, Node B-1, Node B-2. Node B-3, Node HOU), so that the Agents 150 may assist the Contacts 1101 with a variety of goods and services, depending on the particular Contact Center 100. Alternative embodiments of the present invention may include an advanced queuing system as applied to Contact Centers other than the Contact Center depicted in FIG. 1.

The present invention is an advanced queuing system and method that is used when the number of incoming Contacts 101 exceeds the number of Agents 150, resulting in perceived long hold times for the Contact 101. When the Contact 101 first enters the queue and the contact router can see a significant delay is likely, the Contact 101 is advised that the hold time is long and is offered the opportunity to continue to hold, or to call back at a later time and be put at the head of queue. This allows more efficient operation of the Contact Center 100 and allows the Contact 101 to plan their time without being "trapped" holding on a line for long periods.

The solution is to offer the Contact 101 an opportunity to call back in to the Contact Center 100 at a pre-arranged time and receive almost immediate service. The present invention will free the Contact 101 to do other things, it will help to balance the Agent 150 load in the Contact Center 100, and it will substantially reduce network access costs, both of which save the Contact Center 100 operator money while raising Contact 101 satisfaction. The Contact 101 no longer has to wait, listen to unwanted messages, nor sit by the phone waiting for the Contact Center 100 to call back. The Contact 101 feels more in control and the implied feeling that the Contact Center 100 is "more important and too busy to service me" is gone.

The present invention may be implemented in several embodiments. One embodiment includes a Contact 101 dialing the Contact Center 100 and selecting a function, e.g., customer service for widgets, that has a long hold time. The Contact Center 100 analyzes the estimated hold time and after seeing it would exceed 4 minutes (a human would view anything over 4 minutes as a "long time" for this specific application) informs the Contact 101 what the estimated hold time is and offers them the option to keep holding, or for the Contact 101 to call back for almost immediate service at the first available time that it knows the capacity exists to move the Contact 101 to the status of the next party to be handled. This time is given as a suggestion and if not acceptable to the Contact 101, they can negotiate for later times. The Contact 101 is given an identification number to use when they call back, and in alternative embodiments, a new telephone number to call. This identifies the contact to the system when they call at the new time and the system then moves them to the status of the next caller to be handled.

While it is easy to see how the Contact 101 would interact with this system, the actual implementation can be fairly complex. The following are a few of many implementation examples for calculating an immediate callback time and should not limit the present invention to these specific examples. The difficult part is to predict the workload of the Contact Center 100 over the next 6-12 hours of operation, by looking at the scheduled staffing and finding dips where excess capacity exists. Implementation of the present invention will operate to smooth out dips and crests in call traffic volume by predicting the traffic volume and assigning calls in a crest to a dip in volume. Software currently exists to make such predictions. Implementation of such software includes consulting the outputs created by the software, the output being based on historical behavior. This concept shall be explained further later in this document.

Another approach to creating capacity for this system would be to reserve a maximum number of allowed system starts per time slot for reassigned calls. The work shifts could be broken up into 15 minute time intervals, and depending on the predicted arrival of non system traffic that typically arrives in one of these time intervals, and considering the Agent 150 staff available, each time slot is allowed a certain amount of system call starts. Note that as the ratio of system Contacts 101 in a time slot approaches the number of actual Agents 150, random Contacts 101 that are not part of the system and choose to "just keep waiting" will need to wait longer and longer for service. Over time, the Contact Center 100 will be able to predict better how many Contacts 101 will "just keep waiting", as opposed to those who will use the SRQP system. Then, depending on the performance statistics for each group, the "waiters" and the system Contacts 101, the Contact Center 100 can tune its staffing level and what percentage of capacity should be reserved for the system. The means for calculating an immediate callback time may incorporate several different methods and algorithms, and should not be limited to those disclosed herein.

Most Contact Centers 100 measure their performance with a system that works like this: "X percent of the calls were answered in Y seconds." Commonly, these values are: "80% of the calls were answered in 20 seconds." These values can be very misleading because if an average wait report is generated for the span of an 8 hour work day, the aforementioned "80/20" goal can be met while still having a significant number of Contacts 101 waiting 10 or more minutes. This is an unwanted scenario. Since the typical Agent 150 work shift is 8 hours, and peak loads are often 3 times that of off peak loads, there is considerable capacity in the Contact Center 100 that is wasted to meet the performance criteria at peak load, or it is likely that if the numbers are averaged over the shift that a number of Contacts 101 are experiencing long waits at peak times. Also, many Contact Center 100 applications have call arrivals in peaks that are driven by unpredictable events (such as a new virus outbreak, or perhaps a new product release). In this case the staffing of the Contact Center 100 cannot keep up with the calling requirements without seriously overstaffing which leads to great expense. The system and method of the present invention can leave the Contact 101 in control, and allow performance of each of the groups to be measured separately where the standards for each group are purposely set appropriately.

Note that many Contact Centers 100 use an application called "Workforce Management" that is designed to help predict needed staffing. This application looks at common historical call patterns from similar time intervals (i.e. what happened on the same day last week), the available Agent 150 staff, available work hours and allowable work times (some employees might be hired to only work a 4 hour shift) and it will schedule each employee's start time, end time, lunch time, and break times. It would be possible to feed the system data into such an application, or to enhance the workforce management system to predict the amount of system capacity that should be offered during any time interval, based on call load and staffing.

Figure 2:
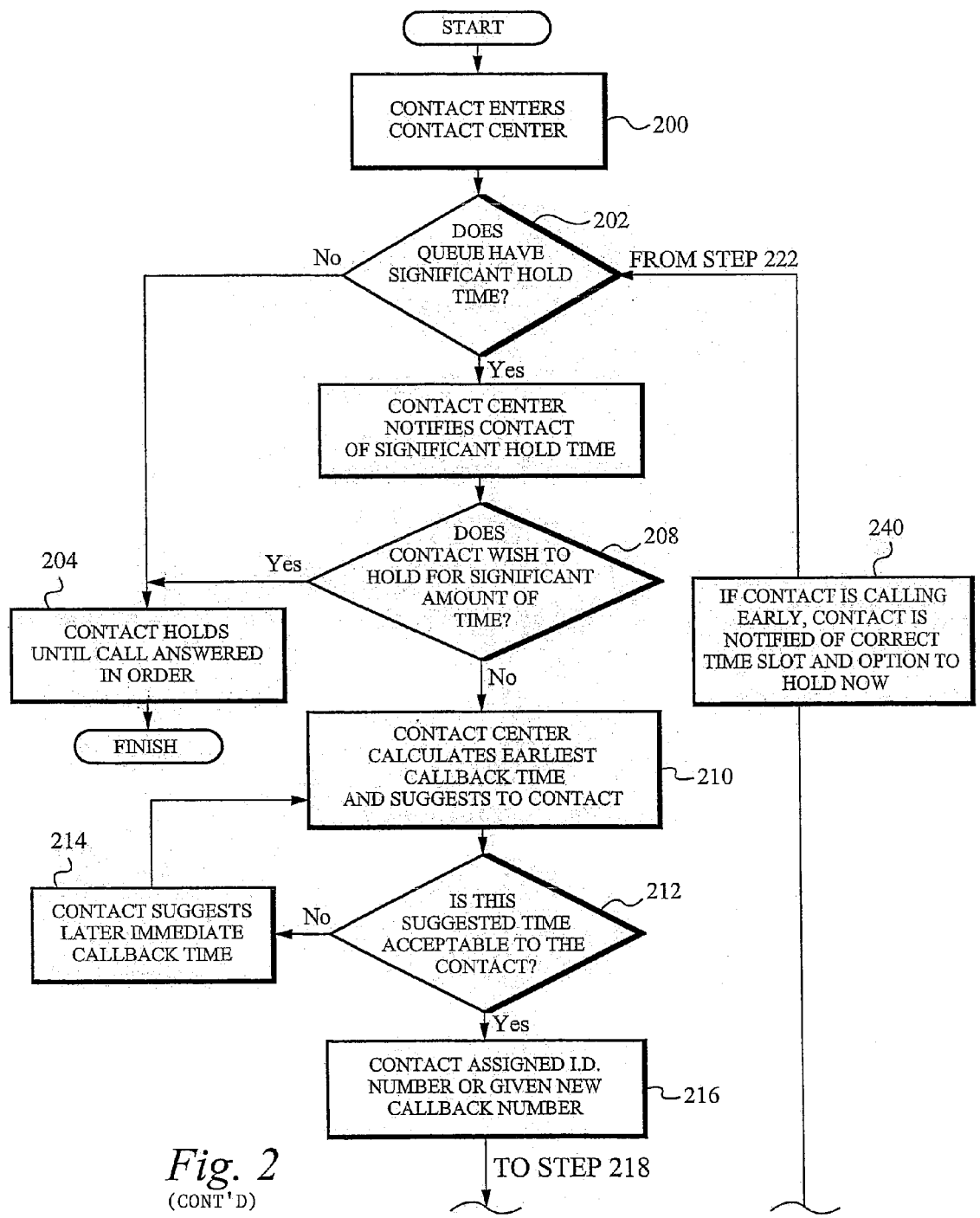
FIG. 2 illustrates a flow chart representation of the preferred embodiment of the present invention.
Figure 2:
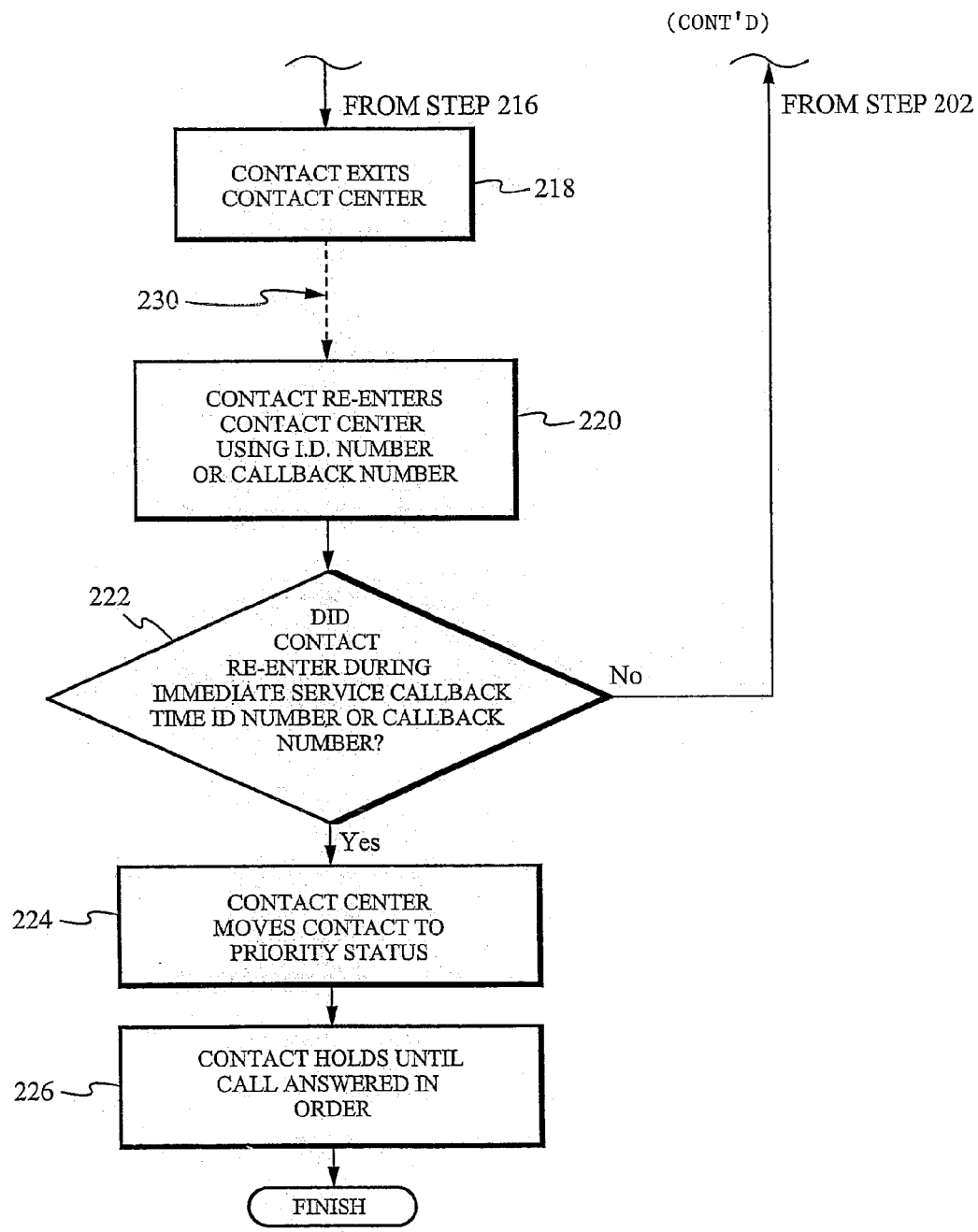

FIG. 2 illustrates a flowchart of a method of the present invention. In the first step 200, a contact enters the Contact Center 100 (FIG. 1) by calling in through a public switched telephone network. After the contact enters the Contact Center 100, the next step 202 includes the Contact Center 100, through its routing and queuing system, determining whether the queue has a significant hold time. A significant queue time may vary depending on the particular Contact Center 100 and the amount of traffic currently in the Contact Center 100. Some Contact Centers 100 may consider any hold time greater than 30 seconds a significant amount of time, while others may consider 4-6 minutes and greater a significant amount of time. This can also vary by the type of call or media of access. If the queue does not have a significant hold time, the next step 204 puts the contact on hold until the contact's call is answered in order, thus completing the call.

If in step 202, the queue does have a significant hold time, the Contact Center 100 will notify the contact of this significant hold time in step 206. In step 208, the contact will then be asked whether the contact would like to continue holding for a significant amount of time. If the contact responds affirmatively to the step 208 inquiry, the contact will hold until the call is answered in step 204, again completing the call. However, if at step 208, the contact does not wish to hold for a significant amount of time, the Contact Center 100 will calculate the earliest immediate call back time and suggest this time to the contact in step 210. In step 210, the Contact Center 100 will use a model of the number of Contacts accessing the Contact Center 100 throughout the day, and compare this model to the customer contact capacity of the Contact Center 100. Through this comparison, the Contact Center 100 can utilize an algorithm to calculate the earliest immediate callback for the contact in step 210.

After suggesting this earliest immediate callback time to the contact in step 210, the Contact Center 100 will ask the contact whether the suggested immediate callback time is acceptable in step 212. If the suggested immediate callback time is not acceptable to the contact, the contact may suggest a later immediate call back time in step 214 or choose from the other times offered by the Contact Center 100, after which, the Contact Center 100 will again calculate an earliest immediate callback time in step 210 based on the contact's suggestion from step 214. If the original suggested immediate callback time is acceptable to the contact in step 212, the contact is assigned an identification number or given a new callback number in step 216.

Still referring to FIG. 2, after receiving an identification number or a new callback number in step 216, the contact will exit the Contact Center 100 in step 218. In this step, after the contact receives the identification number from the Contact Center 100, the contact may hang up the phone, disconnecting him or herself from the Contact Center 100. After the contact disconnects from the Contact Center 100 in step 218, the contact will then be free to perform any personal tasks while disconnected. This disconnected state is illustrated by the dashed line in path 230. In other words, disconnecting in step 218 after receiving an immediate callback time in step 216 allows a contact the highest convenience so that the contact is not required to stay on the phone holding for a long time, and further the contact will not be required to wait for a callback from the Contact Center 100. In fact, the contact may incorporate the immediate callback time into his or her own personal schedule.

Still referring to FIG. 2, at the assigned immediate callback time, the contact will re-enter the Contact Center 100 at step 220 using the callback code assigned by the Contact Center's 100. This callback code may be implemented in a number of ways. The contact may dial the Contact Center 100 at the same phone number originally used to access the Contact Center 100 and enter an assigned code when prompted to do so. Alternatively, the contact may be instructed to call a new phone number to customer service line and enter an assigned code. Further, for added security, the Contact Center may assign the contact a unique telephone number that can be reused for other customers later. All of these methods provide the Contact Center 100 and the contact with a capable alternative to re-entering the Contact Center 100 at step 220, while providing the Contact Center 100 with security, i.e., a contact not assigned the callback code would have a difficult time entering the Contact Center 100 by guessing the assigned contact's callback code. Preferably, the Contact Center 100 will utilize a combination of the aforementioned callback codes, such that a unique telephone number will be assigned to the contact and the contact would also be required to enter a code when prompted. This preferred method provides the Contact Center 100 with the most security in step 220.

After re-entering the Contact Center 100 with the callback code in step 220, in the step 222 the Contact Center 100 will determine whether the contact re-entered in the pre-assigned time slot. If the contact did not, a contact calling late, i.e., after his assigned time window, will return to step 202 and the Contact Center 100 will then determine whether the queue has a significant hold time. If the contact called in early, i.e., before his assigned time slot, the contact will be notified in step 240 of the appropriate time to call giving the contact an opportunity to hang before being returned to step 202. If the contact did re-enter the Contact Center 100 at the appropriate time, then the Contact Center 100 moves the contact to "next call handled" status in step 224. The contact will then hold for a relatively short time (again, depending on the particular Contact Center 100) before his or her call is answered in order in step 226.

Figure 3A:
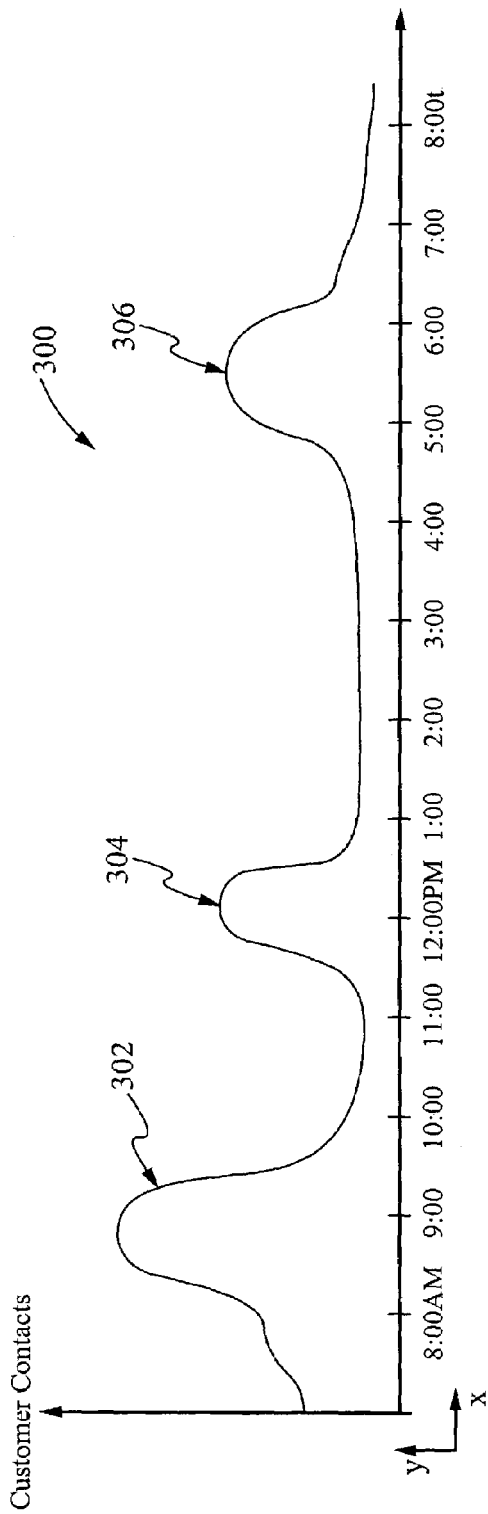
FIG. 3a illustrates a graphical representation of a typical Contact load.

Referring now to FIG. 3a, the Contacts Graph 300 depicts a typical Contact load on the vertical axis during the course of a Contact Center's 100 work day on the x-axis. While this Contacts Graph 300 is merely representation of a typical day and does not contain values for the number of contacts on the y-axis, it is of the utmost importance that the peak time in this Contacts Graph 300 are realized. In other words, this Contacts Graph 300 is intended to depict a typical day having typical peak times, and should not be read as the only possible Contact load that is possible. For some applications, the contact load peaks in a Morning Peak 302, a Lunch Peak 304 and an Evening Peak 306. Typically, the morning hours leading up to the Morning Peak 302 show a sharp incline in Contact load while the hours after the Evening Peak 306 show a steady decline.

Figure 3B:
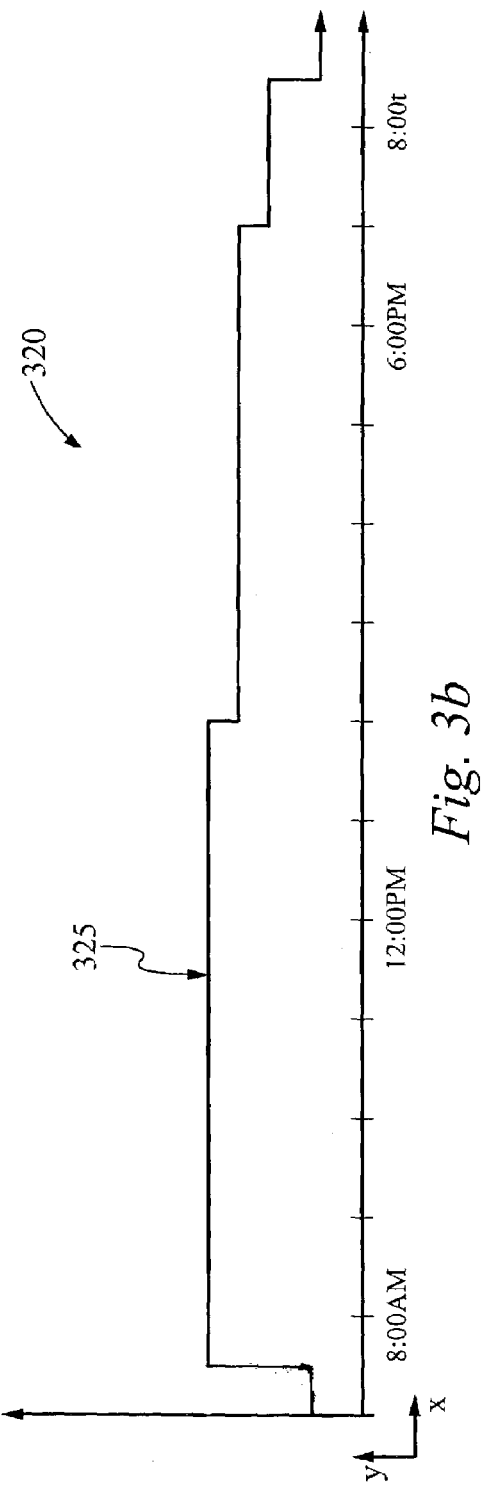
FIG. 3b illustrates a graphical representation of a Contact Capacity of an embodiment of the present invention.

Referring now to FIG. 3b, the Contact Capacity along the y-axis of the Capacity Graph 320 represents the number of agents currently accepting calls. As can be seen by the Agent Capacity 325 as graphed throughout the course of an entire day (as shown in the x-axis), shift scheduling causes the Agent Capacity 325 to be at a constant rate during the course of a day. Of course there may be slight agent overlap during a shift change. However, the Agent Capacity 325 generally remains at a relatively constant level, while shifting according to shift changes and shift overlaps, thereby typically creating an Agent Capacity 325 that is relatively horizontal and varying in amplitude as depicted in FIG. 3b.

FIG. 4a combines the Contacts Graph 300 with the Capacity Graph 320 to create a Comparative Graph 400 that demonstrates the Contact Surplus 405 as well as Agent Surplus 410 that occurs due to normal Contact Center 100 (FIG. 1) operation. A Contact Surplus 405 occurs when a Contact Peak 302, 304, 306 (FIG. 3a) causes the number of contacts to exceed the Agent Capacity 425. A Contact Surplus 405 is precisely the type of event that triggers relatively long hold times for the contacts. As is depicted in FIG. 4a, a decrease in the Agent Capacity 425 creates an even larger contact Surplus 405 in some areas.

Conversely, when the Agent Capacity 425 is much greater than the Contact load, an Agent Surplus 410 is realized. An Agent Surplus 410 is economically inefficient as agents are being paid to essentially sit and do nothing. Oftentimes, an Agent Surplus 410 may also affect the productivity of an agent as more down time allows for breaks in concentration. Because the Agent Surplus 410 in any given Contact Center 100 is ordinarily much greater than the Contact Surplus 405, the present invention should operate in relative ease to redistribute the Agent Surplus 410 to the Contact Surplus 405, as will be shown in FIG. 4b.

The outcome of implementing the present invention is depicted in FIG. 4b. Here, according to a predetermined algorithm, contacts in a Contact Surplus 405 are given the opportunity to call back at a later time, thereby attempting to eliminate the Contact Surplus 405 by redistributing this Contact Surplus 405 in to the Agent Surplus 410 by scheduling the Contact Surplus 405 calls into the Agent Surplus 410 times. In a preferred embodiment of the present invention, eliminating the Contact Surplus 405 and redistributing this Contact Surplus 405 into the Agent Surplus 410 will significantly lower the need for the present Agent Capacity 425. It should be noted that in a typical Contact Center 100, the Agent Capacity 425 will decrease over the course of a typical eight hour work day. The redistributed Contact Surplus 405 is shown here in FIG. 4b as cross hatching in the Agent Surplus 410. It is realized by this aspect of FIG. 4b that the present invention will allow the Agent Capacity 425 to be lowered to reduce the overall staffing levels and costs to the Contact Center 100, while still meeting performance goals such as "80% of the calls were answered in 20 seconds." The reduced agent staffing level is depicted in FIG. 4b with the Reduced Agent Capacity 450 level, illustrated as a dashed line. The Reduced Agent Capacity 450 represents the ability of the Contact Center 100 to reduce the overall staffing levels by implementing the present invention. Therefore, still referring to FIG. 4b, implementing the present invention will allow the Contact Center's 100 staffing to lower the Agent Capacity 425, thereby reducing costs.

It is also important to note that the graphical representations in FIGS. 3a-4b may also be extrapolated to incorporate a method and solution for a 24 hour time frame. This extended time frame may be of great importance when applied to an international call center and/or international Contacts 101 dialing into a domestic call center, where time zone differences may create a Contact Surplus 405 at other times of day.

Still referring to FIG. 4*b*, a preferred embodiment will include deriving an algorithm to efficiently predict contact volume by breaking a work day into Time Slots 430. The number and duration of the Time Slots 430 are dependant upon the particular Contact Center 100. Of course, additional embodiments my include several different algorithms better able to predict contact volumes in order to properly schedule callback times for contacts that call during a Contact Surplus.

The present invention has been described in terms of specific embodiments incorporating details to facilitate the understanding of the principles of construction and operation of the invention. Such reference herein to specific embodiments and details thereof is not intended to limit the scope of the claims appended hereto. For example, the system and method of the present invention may be implemented in a Contact Center other than the one incorporated by reference and described in this document. It will be apparent to those skilled in the art that modifications can be made in the embodiment chosen for illustration without departing from the spirit and scope of the invention.

What is claimed is:

1. A method of distributing contact volume in a contact center, comprising the steps of:
   a. calculating a callback time with a distribution algorithm, wherein the distribution algorithm is a function of an established staffing capacity and anticipated new call levels without requiring adjusting staffing capacity for peak times until substantially all available staffing capacity is consumed;
   b. verifying that the callback time is acceptable to a contact;
   c. assigning a callback code to the contact;
   d. disconnecting the contact from the contact center; and
   e. providing priority service to the contact when the contact, reconnects to the contact center, and enters the callback code at the verified callback time.

2. The method as claimed in claim 1 further comprising notifying the contact of a significant hold time when the contact enters the contact center having the significant hold time.

3. The method as claimed in claim 1 wherein when the contact does not wish to be assigned the callback code, the contact will hold for the significant hold time until service is provided.

4. The method as claimed in claim 1 wherein the verifying step also includes negotiating a suggested callback time when the calculating step provides an unacceptable callback time.

5. The method as claimed in claim 4 wherein the verifying step also includes recalculating the callback time with the distribution algorithm and the suggested callback time.

6. The method as claimed in claim 5 wherein the verifying step also includes reverifying that the callback time is acceptable to the contact.

7. The method as claimed in claim 1 wherein the contact re-enters the contact center using the callback code.

8. The method as claimed in claim 1 wherein priority service is relative to the significant hold time.

9. The method as claimed in claim 1 wherein the significant hold time is a predetermined value.

10. The method as claimed in claim 1 wherein the distribution algorithm assigns the contact the callback time based on a set of predicted call volume data.

11. A system for managing a queue and distributing contact volume in a contact center, comprising:
    a. means for calculating a callback time with a distribution algorithm, wherein the distribution algorithm is a function of an established staffing capacity and anticipated new call levels without requiring adjusting staffing capacity for peak times until substantially all available staffing capacity is consumed;
    b. means for verifying that the callback time is acceptable to a contact;
    c. means for assigning a callback code to the contact;
    d. means for disconnecting the contact from the contact center; and
    e. means for providing priority immediate service to the contact when the contact, reconnects to the contact center, and enters the callback code at the verified callback time.

12. The system as claimed in claim 11 further comprising means for notifying the contact of a significant hold time when the contact enters the contact center having the significant hold time.

13. The system as claimed in claim 11 wherein when the contact does not wish to be assigned the callback code, the contact will hold for the significant hold time until service is provided.

14. The system as claimed in claim 11 wherein the verifying means also includes means for negotiating a suggested callback time when the calculating means provides an unacceptable callback time.

15. The system as claimed in claim 14 wherein the verifying means also includes means for recalculating the callback time with the distribution algorithm and the suggested callback time.

16. The system as claimed in claim 15 wherein the verifying means also includes means for reverifying that the callback time is acceptable to the contact.

17. The system as claimed in claim 11 wherein the contact re-enters the contact center using the callback code.

18. The system as claimed in claim 11 wherein priority service is relative to the significant hold time.

19. The system as claimed in claim 11 wherein the significant hold time is a predetermined value.

20. The system as claimed in claim 11 wherein the distribution algorithm assigns the contact the callback time based on a set of predicted call volume data.

21. An article of manufacture comprising a computer readable medium bearing program code embodied therein for use with a computer, the computer program code including:
    a. means for calculating a callback time with a distribution algorithm, wherein the distribution algorithm is a function of an established staffing capacity and anticipated new call levels without requiring adjusting staffing capacity for peak times until substantially all available staffing capacity is consumed;
    b. means for verifying that the callback time is acceptable to a contact;
    c. means for assigning a callback code to the contact;
    d. means for disconnecting the contact from the callback center contact center; and
    e. means for providing priority immediate service to the contact when the contact, reconnects to the contact center, and enters the callback code at the verified callback time.

22. The article of manufacture as claimed in claim 21 further comprising means for notifying the contact of a significant hold time when the contact enters the contact center having the significant hold time.

23. The article of manufacture as claimed in claim 21 wherein when the contact does not wish to be assigned the callback code, the contact will hold for the significant hold time until service is provided.

24. The article of manufacture as claimed in claim 21 wherein the verifying means also includes means for negotiating a suggested callback time when the calculating means provides an unacceptable callback time.

25. The article of manufacture as claimed in claim 24 wherein the verifying means also includes means for recalculating the callback time with the distribution algorithm and the suggested callback time.

26. The article of manufacture as claimed in claim 25 wherein the verifying means also includes means for reverifying that the callback time is acceptable to the contact.

27. The article of manufacture as claimed in claim 21 wherein the contact re-enters the contact center using the callback code.

28. The article of manufacture as claimed in claim 21 wherein priority service is relative to the significant hold time.

29. The article of manufacture as claimed in claim 21 wherein the significant hold time is a predetermined value.

30. The article of manufacture as claimed in claim 21 wherein the distribution algorithm assigns the contact the callback time based on a set of predicted call volume data.

* * * * *